United States Patent [19]
Stempel et al.

[11] 3,950,320
[45] Apr. 13, 1976

[54] PHENYLAZO DERIVATIVES OF ANTIBIOTIC X-537A

[75] Inventors: Arthur Stempel, Teaneck; John Westley, Mountain Lakes, both of N.J.

[73] Assignee: Hoffmann-La Roche Inc., Nutley, N.J.

[22] Filed: June 26, 1974

[21] Appl. No.: 483,259

Related U.S. Application Data

[62] Division of Ser. No. 300,091, Oct. 24, 1972, Pat. No. 3,836,516, which is a division of Ser. No. 851,044, Aug. 18, 1969, Pat. No. 3,715,372.

[52] U.S. Cl. ............ 260/152; 260/156; 260/345.8; 424/226
[51] Int. Cl.² A23K 1/17; A61K 21/00; C07D 7/100
[58] Field of Search ..................................... 260/152

[56] References Cited
UNITED STATES PATENTS

| | | | |
|---|---|---|---|
| 2,733,236 | 1/1956 | Toulmin | 260/152 |
| 3,445,455 | 5/1969 | Kiss et al. | 260/152 X |
| 3,496,189 | 2/1970 | Wirth et al. | 260/152 X |

OTHER PUBLICATIONS

Berger et al, J. Am. Chem. Soc., Vol. 73, pp. 5295 to 5298 (1951).

*Primary Examiner*—Floyd D. Higel
*Attorney, Agent, or Firm*—Samuel L. Welt; Bernard S. Leon; Frank P. Hoffman

[57] ABSTRACT

Derivatives of antibiotic X-537A of the formula

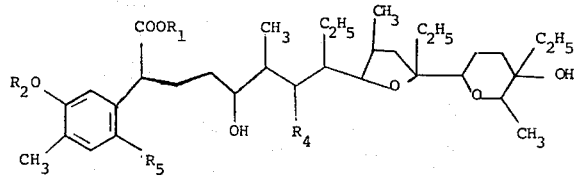

wherein $R_1$ is selected from the group consisting of hydrogen, lower alkyl, phenyl, and phenyl substituted by a member of the group consisting of halogen, nitro, and lower alkyl; $R_2$ is selected from the group consisting of hydrogen, lower alkyl, lower alkanoyl,

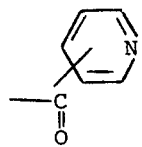

benzoyl, and benzoyl substituted by a member of the group consisting of halogen, nitro and lower alkyl; $R_5$ is selected from the group consisting of phenylazo and phenylazo substituted by a member of the group consisting of halogen, nitro, lower alkyl and lower alkoxy; and $R_4$ is selected from the group consisting of $-OH$, $=O$, and $=N-OH$ and the pharmaceutically acceptable alkali metal, alkaline earth metal and ammonium salts thereof, together with methods for their preparation are disclosed. These derivatives are useful as coccidiostatic agents and antibacterial agents.

2 Claims, No Drawings

PHENYLAZO DERIVATIVES OF ANTIBIOTIC X-537A

CROSS-REFERENCE TO RELATED APPLICATIONS

This application is a divisional application of copending application Ser. No. 300,091 filed Oct. 24, 1972, now U.S. Pat. No. 3,836,516 which is a division of application Ser. No. 851,044 filed Aug. 18, 1969 now U.S. Pat. No. 3,715,372.

DESCRIPTION OF THE INVENTION

This invention relates to novel derivatives of antibiotic X-537A and to methods of preparing these derivatives. More particularly, the invention relates to derivatives of antibiotic X-537A prepared by substitution on the phenyl ring of the antibiotic, or substitution at the ketone position of the antibiotic molecule. These novel derivatives exhibit activity as coccidiostatic agents and antibacterial agents.

Antibiotic X-537A is the designation given to a crystalline antibiotic produced by a Streptomyces organism isolated from a sample of soil collected at Hyde Park, Massachusetts. Lyophilized tubes of the culture bearing the laboratory designation X-537 were deposited with the United States Department of Agriculture, Agricultural Research Service, Northern Utilization Research and Development Division, Peoria, Ill. The culture, given identification number NRRL 3382 by the Agricultural Research Service, has been made available to the public through NRRL.

The antibiotic material, heretofore identified as antibiotic X-537A, upon laboratory analysis has been found to be 3-methyl-6- 7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl -salicylic acid, i.e., a compound of the formula

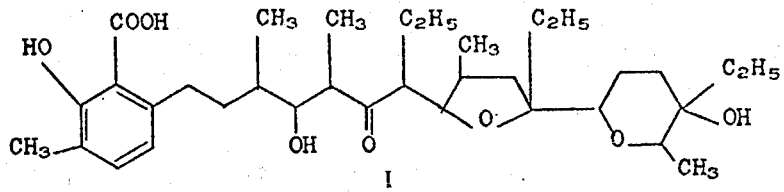

I

Antibiotic X-537A is prepared by growing the Steptomyces organism in an aerated submerged culture, with the pH of the broth adjusted to about neutral, i.e., about 6.5 to 7.5. The medium utilized contains a nitrogen source, such as yeast, a yeast derived product, corn meal, bean meal and the like, with soybean meal being the most preferred; and a carbohydrate source, such as sugar, molasses and the like, with brown sugar being the most preferred. The fermentation was carried out at slightly elevated temperatures, i.e., between about 25° and 35°C., with the preferred incubation temperature being about 28°C. After an incubation of about 4 to 6 days, the fermentation broth was filtered and the antibiotic recovered by extraction.

As indicated above, the present invention relates to novel derivatives of antibiotic X-537A. The novel derivatives to which the invention relates are selected from the group consisting of compounds of the formula

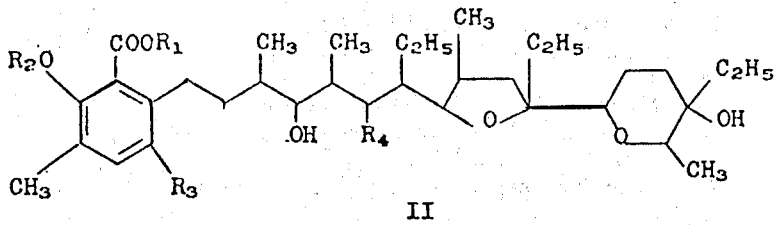

II wherein $R_1$ is selected from the group consisting of hydrogen, lower alkyl, phenyl, and phenyl substituted by a member of the group consisting of halogen, nitro and lower alkyl; $R_2$ is selected from the group consisting of hydrogen, lower alkyl, lower alkanoyl,

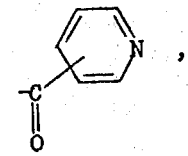

benzoyl, and benzoyl substituted by a member of the group consisting of halogen, nitro and lower alkyl; $R_3$ is selected from the group consisting of hydrogen, halogen, nitro, amino, lower alkylamido, lower alkylamino, phenylazo and phenylazo substituted by a member of the group consisting of halogen, nitro, lower alkyl and lower alkoxy; $R_4$ is selected from he group consisting of —OH, =O, and =N—OH, provided that at least one of $R_1$, $R_2$ and $R_3$ is other than hydrogen, or $R_4$ is other than =O; compounds of the formula

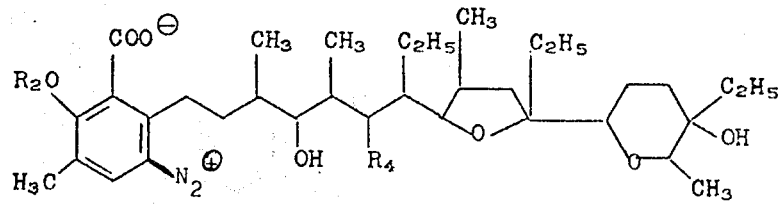

III wherein $R_2$ and $R_4$ are as described above and the pharmaceutically acceptable salts of the compounds of formula II.

As used herein, the term "lower alkyl" denotes straight or branched chain hydrocarbon groups containing from 1 to 7 carbon atoms inclusive, such as methyl, ethyl, propyl, isopropyl, butyl, pentyl, hexyl and the like, with groups containing from 1 to 4 carbon atoms being preferred. The term "lower alkanoyl" includes the acyl residue of lower alkanoic acids, preferably containing from 2 to 4 carbon atoms, for example, acetyl, propionyl, and the like. The term "halogen" includes all four forms thereof, that is fluorine, chlorine, bromine and iodine.

Representative of the compounds of formulae II and III are:

3-Methyl-6-[4,6-dihydroxy-3,5-dimethyl-7-ethyl-7-[5-ethyl-3-methyl-5-(5-ethyl-5-hydroxy-6-methyl-2-tetrahydropyranyl)-2-tetrahydrofuryl]heptyl] salicylic acid;

(−)—3-Methyl-6-[7-ethyl-4-hydroxy-6-hydroxyimino-3,5-dimethyl-7-[5-ethyl-3-methyl-5-(5-ethyl-5-hydroxy-6-methyl-2-tetrahydro-pyranyl)-2-tetrahydrofuryl]heptyl]salicylic acid, sodium salt;

(−)-3-Methyl-6-[7-ethyl-4-hydroxy-6-hydroxyimino-3,5-dimethyl-7-[5-ethyl-3-methyl-5-(5-ethyl-5-hydroxy-6-methyl-2-tetrahydro-pyranyl)-2-tetrahydrofuryl]heptyl]salicylic acid, hydroxylammonium salt;

(+)-3-Methyl-6-{7-ethyl-4-hydroxy-6-hydroxyimino-3,5-dimethyl-7-[5-ethyl-3-methyl-5-(5-ethyl-5-hydroxy-6-methyl-2-tetrahydro-pyranyl)-2-tetrahydrofuryl]heptyl} salicylic acid, sodium salt;

3-Methyl-6-{7-ethyl-4-hydroxy-6-hydroxyimino-3,5-dimethyl-7-[5-ethyl-3-methyl-5-(5-ethyl-5-hydroxy-6-methyl-2-tetrahydropyranyl)-2-tetrahydrofuryl]heptyl} salicylic acid, methyl ester, isomer A;

3-Methyl-6-{7-ethyl-4-hydroxy-6-hydroxyimino-3,5-dimethyl-7-[5-ethyl-3-methyl-5-(5-ethyl-5-hydroxy-6-methyl-2-tetrahydropyranyl)-2-tetrahydrofuryl]heptyl}salicylic acid methyl ester, isomer B;

3-Methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} acetyl salicylic acid, methyl ester;

2-Methoxy-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} benzoic acid, methyl ester;

Ammonium-3-methyl-2-(2-methyl-propionyloxy)-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}benzoate;

Ammonium-3-methyl-2-nicotinoyloxy-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} benzoate;

5-Nitro-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl}salicylic acid, sodium salt;

5-Amino-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} salicylic acid;

5-Acetamido-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} salicylic acid;

5-Acetamido-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} acetyl salicylic acid;

5-Diazo-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl } salicylic acid; 5-Phenylazo-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} salicylic acid;

2-Benzoyloxy-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} benzoic acid.

A preferred group of compounds falling within the scope of formula II are those having the formula

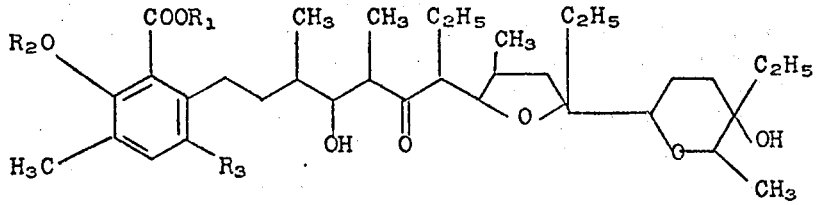

II - a wherein $R_1$–$R_3$ are as described above and the pharmaceutically acceptable salts thereof.

A most preferred group of compounds falling within the scope of formula II are those having the formula

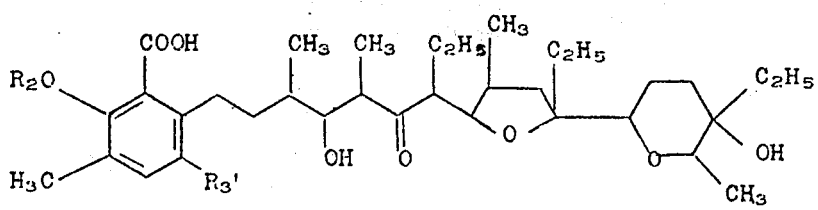

II - b wherein $R_2'$ is hydrogen or lower alkanoyl, $R_3'$ is hydrogen or halogen, and at least one of $R_2'$ or $R_3'$ is other than hydrogen,
and the pharmaceutically acceptable salts thereof.

Representative of the compounds of formula II-b are:
3-Methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}acetyl salicylic acid, sodium salt;
3-Methyl-2-propionyloxy-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}benzoic acid, sodium salt;
2-Butyryloxy-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}benzoic acid, sodium salt;
5-Bromo-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)2-tetrahydrofuryl]heptyl}salicylic acid, sodium salt;
5-Iodo-3-methyl-6-{7-ethyl-4-hydroxy-3,5-dimethyl-6-oxo-7-[5-ethyl-2-methyl-5-(5-ethyl-5-hydroxy-6-methyl-2-tetrahydropyranyl)-2-tetrahydrofuryl]heptyl} salicylic acid, sodium salt;
5-Chloro-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)2-tetrahydrofuryl]heptyl}salicylic acid;
5-Bromo-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}acetyl salicylic acid, sodium salt.

Further, the present invention relates to dehydrated derivatives of antibiotic X-537A. These dehydration products may be represented by the formula

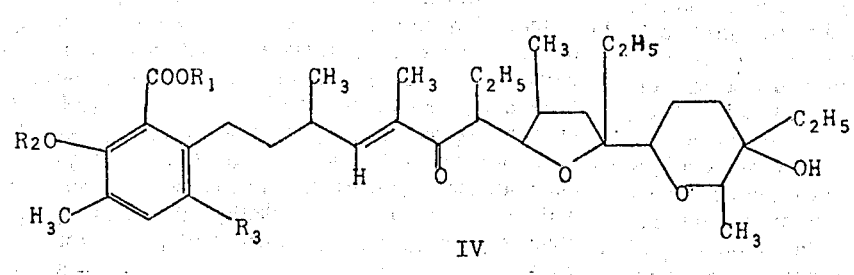

IV wherein $R_1$-$R_3$ are as described above, and the pharmaceutically acceptable salts thereof.

Representative of compounds of formula IV are:
3-Methyl-6-{7-ethyl-3,5-dimethyl-6-oxo-7-(5-ethyl-3-methyl-5-[5-ethyl-5-hydroxy-6-methyl-2-tetrahydropyranyl)-2-tetrahydrofuryl]-4-heptenyl} salicylic acid, sodium salt, Isomer A;
3-Methyl-6-{7-ethyl-3,5-dimethyl-6-oxo-7-[5-ethyl-3-methyl-5-(5-ethyl-5-hydroxy-6-methyl-2-tetrahydropyranyl)-2-tetrahydrofuryl]-4-heptenyl} salicylic acid, sodium salt, Isomer B;
5-Bromo-3-methyl-6-{7-ethyl-3,5-dimethyl6-oxo-7-[5-ethyl-3-methyl-5-(5-ethyl-5-hydroxy-6-methyl-2-tetrahydropyranyl)-2-tetrahydrofuryl]-4-heptenyl} salicylic acid, sodium salt.

The derivatives of antibiotic X-537A form a variety of pharmaceutically acceptable salts. These salts are prepared from the free acid form of the antibiotic or its derivatives by methods well known in the art; for example, by washing the free acid in solution with a suitable base or salt. Examples of such pharmacuetically acceptable basic substances capable of forming salts for the purpose of the present invention include alkali metal bases, such as sodium hydroxide, potassium hydroxide, lithium hydroxide and the like; alkaline earth metal bases, such as calcium hydroxide, barium hydroxide and the like; and ammonium hydroxide. Alkali metal or alkaline earth metal salts suitable for forming pharmaceutically acceptable salts can include anions such as carbonates, bicarbonates and sulfates.

The compounds of formulas II, III and IV may be prepared following a variety of procedures. The choice of procedure will depend upon the site or sites upon the antibiotic molecule where substitution is to take place. For example, the compound of formula I or compounds of formulas II and IV above wherein $R_1$ is hydrogen can be converted into the corresponding compounds of formulas II or IV above wherein $R_1$ is alkyl, phenyl and substituted phenyl by conventional esterifying techniques. Representative of compounds which can effect the esterification are lower alkanols, such as ethanol, methanol, propanol, and the like; and aromatic alcohols, such as phenol, p-halophenol, p-nitrophenol, o-nitrophenol, trimethoxyphenol and the like.

The compound of formula I or compounds of formulas II and IV wherein $R_1$ and/or $R_2$ is hydrogen can be converted into the corresponding compounds wherein $R_1$ and/or $R_2$ is lower alkyl. Preferably, the substitution is accomplished by dissolving a compound of formula I or a compound of formulas II or IV above wherein $R_1$ and/or $R_2$ is hydrogen in an inert organic solvent, such as N,N-dimethylformamide. To the resulting solution is added an alkylating agent such as a lower alkyl halide, e.g., methyliodide, ethyliodide, propyliodide and the like, or a dilower alkyl sulfate, e.g., dimethyl sulfate, diethyl sulfate and the like. The reaction mixture is allowed to stand at a temperature in the range of about 20° to about 50°, most preferably at room temperature. When advantageous, the reaction is effected in the presence of a catalyst, which may be a noble metal oxide, such as silver oxide and the like. By proceeding according to this method, from a compound of formula I or compounds of formulas II or IV above wherein $R_1$ and/or $R_2$ is hydrogen, there can be obtained compounds which contain a lower alkyl group in $R_1$ and/or $R_2$.

A compound of formula I or compounds of formulas II or IV above which bear hydrogen at $R_2$ can be provided with a lower alkanoyl group with any conventional and conveniently available lower alkanoyl group providing agents. Representative of such lower alkanoyl group providing agents are acid anhydrides, such as acetic anhydride, propionic anhydride and the like, and acid chlorides, such as acetyl chloride, propionyl chloride, butyryl chloride and the like.

Compounds of formulas II or IV above wherein $R_3$ is halogen can be prepared from the compound of formula I or a compound of formulas II or IV above wherein $R_3$ is hydrogen by any conveniently available halogenating technique. Among the many procedures suitable for this purpose there may be included bromination utilizing bromine, chlorination utilizing chlorine, or iodination utilizing iodine mono-chloride and the like.

Compounds of formulas II or IV above wherein $R_3$ is nitro can be prepared by treating the compound of formula I or a compound of formulas II or IV above wherein $R_3$ is hydrogen with nitric acid in the presence of glacial acetic acid. The resulting nitro compound can be hydrogenated in the presence of any suitable reducing system, such as one which includes Raney nickel, to yield the corresponding compound wherein $R_3$ is amino. It is, of course, to be understood that when a compound of formula IV above is involved, careful selection of the hydrogenation system should be effected so as to reduce the nitro group at $R_3$ while leaving the double bond present in the heptenyl radical unaffected.

If desirable, the compounds of formula II wherein $R_3$ is amino, prepared as described in the preceding paragraph, may be converted to the corresponding diazonium salt of formula III above by treatment with nitrous acid followed by cuprous chloride. The formation of the diazonium salt is effected by first preparing a solution of a compound of formula II above wherein $R_3$ is amino in a dilute mineral acid, such as aqueous sulfuric acid, aqueous hydrochloric acid and the like. This solution is then treated with nitrous acid. Preferably, the nitrous acid is provided by adding to said solution an aqueous solution of an alkali metal nitrite, preferably sodium nitrite. The nitrous acid treatment is preferably carried out at or below room temperature so that the reaction does not proceed too energetically. Thus, temperatures between −5° to 25°C. are preferred.

Compounds of formula II and IV above wherein $R_3$ is amino can be converted to the corresponding compounds wherein $R_3$ is lower alkylamino by conventional alkylation procedures. For example, the sodium salt of a compound of formulas II or IV wherein $R_3$ is amino can be reacted with a molar equivalent of a lower alkyl halide to obtain a compound of formulas II or IV wherein $R_3$ is lower alkylamino. For the purposes of this process, lower alkyl halides such as methyl iodine, ethyl bromide, sulfates such as dimethyl sulfate, diethyl sulfate and the like may be used.

In an alternate process, compounds of formulas II and IV above wherein $R_3$ is lower alkylamino can be prepared by reducing the nitro group of compounds of formulas II and IV above wherein $R_3$ is nitro in the presence of a lower alkyl aldehyde and preferably in the presence of a hydrogenation catalyst such as Raney Nickel.

Compounds of formulas II and IV above wherein $R_3$ is amino can also be converted into the corresponding compounds wherein $R_3$ is lower alkylamido by treating the corresponding compounds wherein $R_3$ is amino with a lower alkanoyl group providing agent. Representative of lower alkanoyl group providing agents are acid anhydrides, such as acetic anhydride, propionic anhydride, butyric anhydride and the like, and acid chlorides such as acetyl chloride, propionyl chloride, butyryl chloride and the like. Conveniently, this reaction is effected in the presence of an inert organic solvent, such as pyridine and the like.

Compounds of formulas II or IV wherein $R_3$ is a phenylazo group or a substituted phenylazo group can be prepared from the compound of formula I or a compound of formulas II or IV above wherein $R_3$ is hydrogen by treating the same with a diazonium salt obtained from aniline or substituted derivatives thereof such as p-chloroaniline, p-nitroaniline, p-lower alkylaniline, p-lower alkoxyaniline and the like. Preferably, this reaction is effected by adding the aniline or the substituted derivative thereof to an aqueous solution of sodium nitrite whereby to form the diazonium salt and then adding the resulting solution containing the diazonium salt to an alcoholic solution of the compound of formula I or a compound of formulas II or IV wherein $R_3$ is hydrogen. Conveniently, the reaction is effected in the cold, e.g., from temperatures of −10° to 15°, most preferably from −5° to 5°.

Compounds of formula II above wherein $R_4$ is a =N—OH group can be prepared from the compound of formula I or a corresponding compound of formula II above wherein $R_4$ is a

group by treating the ketone containing compound with hydroxylamine hydrochloride in a molar excess. The procedure is preferably conducted in the presence of pyridine.

The ketone group present in the compound of formula I or a compound of formula II wherein $R_4$ is =O may be reduced to the corresponding compound of formula II wherein $R_4$ is —OH by treating the starting material with an alkali metal borohydride, such as sodium borohydride, potassium borohydride and the like. Preferably, the reduction is effected in the presence of an inert organic solvent. Among the inert organic solvents suitable for this purpose may be included lower alkanols, such as methanol, ethanol, propanol, butanol and the like, ethers, such as diethyl ether, methylethyl ether, dioxane and the like, and similar type organic solvents.

Compounds of formula IV can be prepared from the compound of formula I or a compound of formula II above wherein $R_4$ is =O by treating said compound with a dehydrating agent. Dehydrating agents suitable for use in the preparation of the compounds of formula IV above according to one broad process aspect of the present invention may be represented by inorganic bases such as alkali metal hydroxides, e.g., sodium hydroxide, potassium hydroxide, and lithium hydroxide, and alkali earth metal hydroxides such as calcium hydroxide, barium hydroxide and the like. An inorganic alkali metal base such as sodium hydroxide is preferred.

In one embodiment of the dehydrating process, the compound of formula I or a compound of formula II above wherein $R_4$ is =O is added to an inert organic solvent, such as p-dioxane. To the resulting reaction mixture is added an aqueous solution of the dehydrating agent, preferably aqueous sodium hydroxide and the mixture is permitted to stand. Although temperature is not a critical aspect of this process embodiment, it is preferable to perform the dehydration at a temperature of from about 20° to about 50°, most preferably at room temperature. The mixture can be maintained under such conditions for a period of one to several hours, with a duration of about seven hours being preferred. Thereafter, the desired product can be isolated and purified from the resulting mixture, which contains both isomers, employing conventional techniques such as recrystallization or chromatography.

The compounds of formulas II and IV, either in their crystalline form or in the form of their pharmaceutically acceptable salts, and the compounds of formula III are useful for both the prophylaxis and therapy of coccidiosis in poultry. Coccidiosis is a disease caused by a microscopic protozoal parasite belonging to the genus Eimeria. The compounds of the present invention are especially useful because of their high activity against single and multiple infections, that is infections caused by a single species or by a combination of species. Following standard procedures for ascertaining coccidiostatic activity, the compounds of formulas II, III and IV were administered to chickens at varying levels in their feed, with the result that these compounds were shown to be active coccidiostats. For example, compounds such as:

3-Methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}acetyl salicylic acid, sodium salt;

3-Methyl-2-propionyloxy-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}benzoic acid, sodium salt;

2-Butyryloxy-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}benzoic acid, sodium salt; and 5-Bromo-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicylic acid, sodium salt show coccidiostatic activity in chickens at a feed level of 0.03 per cent.

Further, the compounds of formulas II and IV, either in their crystalline form or in the form of their pharmaceutically acceptable salts, and the compounds of formula III are useful as antibacterial agents. Following standard procedures for determining antibacterial activity, compounds of the present invention such as:

(−)-3-methyl-6-{7-ethyl-4-hydroxyimino-3,5-dimethyl-7-[5-ethyl-3-methyl-5-(5-ethyl-5-hydroxy-6-methyl-2-tetrahydropyranyl)-2-tetrahydrofuryl]heptyl}salicylic acid, hydroxylammonium salt;

5-bromo-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicylic acid, sodium salt;

5-nitro-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicyclic acid, sodium salt; and 5-iodo-3-methyl-6-{7-ethyl-4-hydroxy-3,5-dimethyl-6-oxo-7-[5-ethyl-2-methyl-5-(5-ethyl-5-hydroxy-6-methyl-2-tetrahydropyranyl)-2-tetrahydrofuryl]heptyl}salicylic acid, sodium salt show in vitro activity against *E. Bacillus*.

The invention is further illustrated by the following examples. Unless otherwise indicated, all temperatures given are in degrees centigrade.

EXAMPLE 1

Preparation of 3-methyl-6{7-ethyl-4-hydroxy-3,5-dimethyl-6-oxo-7-[5-ethyl-3-methyl-5(5-ethyl-5-hydroxy-6-methyl-2-tetrahydropyranyl)-2-tetrahydrofuryl]heptyl}salicylic acid (crystalline antibiotic X-537A)

The Streptomyces organism was grown in aerated submerged culture in shaken flasks. The pH of the broth was adjusted by the addition of KOH solution to 6.5–7.5, then the broth was sterilized. A tank fermentation was used wherein a 5–10% inoculum consisting of 3 day old submerged growth from aerated bottles was used in the tank. The medium contained 2% soybean flour, 2% brown sugar, 0.5 $K_2HPO_4$. The fermentation was carried out at 28°C., under positive air pressure, with air-flows of 5–10 cu. ft. of air per minute per 40 to 80 gallon liquid charge. The broth was harvested after 4 to 6 days fermentation, filtered, and the antibiotic was recovered by extraction. The extraction was carried out as follows:

204 Liters of broth were filtered and the wet filter cake was suspended in 100 liters of butyl acetate and mixture was stirred overnight, at room temperature. The mixture was then filtered and the water layer was separated and discarded. The butyl acetate solution, assaying 30 million Bacillus E units, was concentrated in vacuo to 3 liters, washed with 10% sodium carbonate solution, and dried with anhydrous sodium sulfate.

On further concentration to 300 ml. and dilution with 350 ml. of petroleum ether (b.p. 50°–60°C.), 41 g of solid material, assaying 25 million *Bacillus E* units, separated. This solid material was then extracted in a Soxhlet apparatus with 4 liters petroleum ether (b.p. 50–60°C.) for 40 hours. The extract was taken to dryness in vacuo, the crystalline residue suspended in petroleum ether and filtered, yielding 24.49 g of a mixture of the salt and free acid form of 3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl-2-tetrahydrofuryl]heptyl} salicylic acid. The mother liquor of the solid yielded an additional 5.73 grams of the antibiotic.

After recrystallization from ether-petroleum ether, this material, which contained sodium, was dissolved in ether and washed with dilute sulfuric acid to convert it to the free acid. Removal of the ether left an oily residue which crystallized from ethanol to yield pure 3-methyl-6- 7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl salicylic acid. Several recrystallizations from ethanol did not change the melting point which remained unsharp at 100°–109°C.

EXAMPLE 2

Preparation of 3-methyl-6-{7-ethyl-3,5-dimethyl-6-oxo-7-[5-ethyl-3-methyl-5-(5-ethyl-5-hydroxy-6-methyl-2-tetrahydropyranyl)-2-tetrahydrofuryl]-4-heptenyl} salicyclic acid, sodium salt, Isomer A To a solution of 10 g of crystalline antibiotic X-537A in 100 ml of p-dioxane was added 200 ml of 10% aqueous sodium hydroxide and the mixture stirred at room temperature. After 7 hours the mixture, which had separated into two phases, was extracted twice with an equal volume of ether. The ether extracts were dried (Na$_2$SO$_4$) and concentrated to a viscous oil which on standing partially crystallized. The crystals were removed by the addition of ether and filtration. Recrystallization of a sample from ether gave colorless needles of 3-methyl-6-{7-ethyl-3,5-dimethyl-6-oxo-7-[5-ethyl-3-methyl-5-(5-ethyl-5-hydroxy-6-methyl-2-tetrahydropyranyl)-2-tetrahydrofuryl]-4-heptenyl}-salicylic acid, sodium salt, Isomer A; m.p. 220°, $[\alpha]_D^{25}$ −19.96° (1%, CH$_3$OH).

EXAMPLE 3

Preparation of 3-methyl-6-{7-ethyl-3,5-dimethyl-6-oxo-7-[5-ethyl-3-methyl-5-(5-ethyl-5-hydroxy-6-methyl-2-tetrahydropyranyl)-2-tetrahydrofuryl]-4- heptenyl}salicylic acid, sodium salt, Isomer B The ether filtrate obtained in Example 2 was evaporated to dryness, dissolved in hexane and chromatographed on a florisil column (200 g) using gradient elution from 2 l. hexane/ether (1:1) to 2 l. ether/acetone (1:1). The first fraction eluted was discarded. The second fraction was a mixture, which on concentration and treatment with ethyl acetate gave an additional yield of 3-methyl-6-{7-ethyl-3,5-dimethyl-6-oxo-7-[5-ethyl-3-methyl-5-(5-ethyl-5-hydroxy-6-methyl-2-tetrahydropyranyl)-2-tetrahydrofuryl]-4-heptenyl}salicylic acid, sodium salt, Isomer A. Chromatography of the filtrate on silica gel using gradient elution from methylene chloride to acetone gave the second component of the mixture as an oil, which crystallized on standing to yield 3-methyl-6-{7-ethyl-3,5-dimethyl-6-oxo-7-[5-ethyl-3-methyl-5-(5-ethyl-5-hydroxy-6-methyl-2-tetrahydropyranyl)-2-tetrahydrofuryl]-4-heptenyl}salicylic acid, sodium salt, Isomer B; m.p. 125°, $[\alpha]_D^{25}$ +27.64° (1%, CH$_3$OH).

EXAMPLE 4

Preparation of 5-bromo-3-methyl-6-{7-ethyl-3,5-dimethyl-6-oxo-7-[5-ethyl-3-methyl-5-(5-ethyl-5-hydroxy-6-methyl-2-tetrahydropyranyl)-2-tetrahydrofuryl]-4-heptenyl}salicyclic acid, sodium salt To 1.34 g of crystalline antibiotic X-537A in carbon disulfide (25 ml) was added dropwise a solution of bromine (0.12 ml) in carbon disulfide (10 ml). The reaction mixture was left overnight under a stream of nitrogen to remove the CS$_2$. The residue which contained the free acid form of the desired end product, was dissolved in ethyl acetate. After washing successively with aqueous sodium bisulfite and saturated sodium carbonate, the ethyl acetate solution was dried (Na$_2$SO$_4$) and evaporated under reduced pressure. Crystallization from methylene chloride/hexane gave colorless needles of 5-bromo-3-methyl-6-{7-ethyl-3,5-dimethyl-6-oxo-7-[5-ethyl-3-methyl-5-(5-ethyl-5-hydroxy-6-methyl-2-tetrahydropyranyl)-2-tetrahydrofuryl]-4-heptenyl}salicyclic acid, sodium salt, m.p. 235°, $[\alpha]_D^{25}$ +9.63° (1%, DMSO).

EXAMPLE 5

Preparation of 5-bromo-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} salicylic acid, sodium salt To a solution of 1.53 g of the sodium salt of antibiotic X-537A in 30 ml carbon disulfide was added dropwise a solution of 0.14 ml bromine 10 ml carbon disulfide at −5° over 10 minutes. The solvent was removed under a stream of nitrogen at room temperature (approximately 2 hours). The residue was purified by dissolving it in ethyl acetate and the solution washed successively with aqueous sodium bisulfite and sodium carbonate. After drying (Na$_2$SO$_4$), the solution was evaporated under reduced pressure and the residue crystallized from ethyl acetate to give 5-bromo-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} salicylic acid, sodium salt as colorless cubes, m.p. 185°, $[\alpha]_D^{25}$ −7.36° (1% in methanol).

EXAMPLE 6

Preparation of 3-methyl-6-{4,6-dihydroxy-3,5-dimethyl-7-ethyl-7-[5-ethyl-3-methyl-5-(5-ethyl-5-hydroxy-6-methyl-2-tetrahydropyranyl)-2-tetrahydrofuryl]heptyl} salicylic acid To a solution of 10 g of crystalline antibiotic X-537A in 500 ml of absolute ethanaol was added 1.36 g of NaBH$_4$. The reaction was followed by assaying with thin layer chromatography (silica gel - CHCl$_3$/acetone 8:2) and the reaction was continued overnight after adding an additional 1.0 g of NaBH$_4$. The following morning the solvent was removed under reduced pressure and the heavy oil diluted with methylene chloride, washed with dilute HCl, dried (Na$_2$SO$_4$), and concentrated to a solid foam. The slightly pink solid was chromatographed on a 500 g silica gel column eluting with 2 l. hexane-methylene chloride (1:1), 2 l. methylene chloride 2 l. methylene chloride 2 l. methylene chloride ether (1:1). The 250 ml fractions were assayed by TLC and fractions 13–17 pooled, concentrated to a yellow solid and rechromatographed on a 150 g florisil column eluting with a gradient from hexane to acetone. The fractions containing 3-methyl-6-{4,6-dihydroxy-3,5-dimethyl-7-ethyl-7-[5-ethyl-3-methyl-5-(5-ethyl-5-hydroxy-6-methyl-2-tetrahydropyranyl)-2-tetrahydrofuryl]heptyl} salicylic acid were pooled and concentrated to a small volume from which pure 3-methyl-6-{4,6-dihydroxy-3,5-dimethyl-7-ethyl-7-[ 5-ethyl-3-methyl-5-(5-ethyl-5-hydroxy-6-methyl-2-tetrahydropyranyl)-2-tetrahydrofuryl]heptyl} salicylic acid crystals were recovered, m.p. 151°–153°. From the mother liquor, additional material was crystallized, $[\alpha]_D^{25}$ +0.83 (C=.60%, CH$_3$OH).

EXAMPLE 7

Preparation of
2-methoxy-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} benzoic acid, methyl ester A solution of 5 g of crystalline antibiotic X-537A in 50 ml of N,N-dimethyl formamide was stirred overnight with 6 g of silver oxide and 50 ml of methyl iodide. After assay (TLC silica gel - benzene/acetone, 9:1) an additional 5 g of silver oxide and 10 ml of methyl iodide was added. After 48 hours the solids were removed by filtration and the filtrate diluted with water and methylene chloride. The solvent was separated, removed under reduced pressure and the remaining N,N-dimethyl formamide removed by water washing of an ether solution. The ether layer was chromatographed on a 140 g florisil column eluting with a gradient between hexane (1 liter) to acetone (1 liter). The fractions containing the product were pooled and concentrated to a clear oil which could be distilled at 165° and 0.05 mm. yielded pure 2-methoxy-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} benzoic acid, methyl ester, $[\alpha]_D^{25} -10.79°$ ($CH_3OH$, C = 1%).

EXAMPLE 8

Preparation of
3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} acetyl salicylic acid, sodium salt To a solution of 6.12 g (10 mm.) of crystalline antibiotic X-537A in 10 ml dry pyridine was added 2 ml acetic anhydride. After 2 hours, 10 g of ice was added to the reaction solution and the resulting mixture was washed into a separatory funnel with ethyl acetate and 1N HCl. The ethyl acetate solution was washed with 1N HCl until all the pyridine had been removed. The ethyl acetate solution was then washed with saturated sodium carbonate solution, dried ($Na_2SO_4$) and evaporated to dryness under reduced pressure. The residue was dissolved in methylene chloride and the solution evaporated on the steam bath with additions of hexane until crystallization started. Cooling to 0°, gave 3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} acetyl salicylic acid, sodium salt as white needles, m.p. 186°–187°, $[\alpha]_D^{25} -18.75°$ (1%, $CH_3OH$).

EXAMPLE 9

Preparation of
(−)-3-methyl-6-(7-ethyl-4-hydroxy-6-hydroxyimino-3,5-dimethyl-7-[5-ethyl-3-methyl-5-(5-ethyl-5-hydroxy-6-methyl-2-tetrahydropyranyl)-2-tetrahydrofuryl]heptyl) salicylic acid, hydroxyl-ammonium salt.

A mixture of 10 g of crystalline antibiotic X-537A and 5 g of hydroxylamine hydrochloride in 50 ml ethanol containing 5 ml pyridine was heated under reflux for 60 hours. The solution was evaporated to dryness and 5 ml water added. The solid product was triturated and filtered, then recrystallized from aqueous ethanol to give (−)-3-methyl-6-(7-ethyl-4-hydroxy-6-hydroxyimino-3,5-dimethyl-7-[5-ethyl-3-methyl-5-(5-ethyl-5-hydroxy-6-methyl-2-tetrahydro-pyranyl)-2-tetrahydrofuryl]heptyl) salicylic acid, hydroxylammonium salt; m.p. 168°–170°, $[\alpha]_D^{25} -12.34°$ (1%, DMSO).

EXAMPLE 10

Preparation of
(+)-3-methyl-6-{7-ethyl-4-hydroxy-6-hydroxyimino-3,5-dimethyl-7-[5-ethyl-3-methyl-5-(5-ethyl-5-hydroxy-6-methyl-2-tetrahydropyranyl)-2-tetrahydrofuryl]heptyl} salicylic acid, sodium salt; and (−)-3-methyl-6-{7-ethyl-4-hydroxy-6-hydroxyimino-3,5-dimethyl-7-[5-ethyl-3-methyl-5-(5-ethyl-5-hydroxy-6-methyl-2-tetrahydropyranyl)-2-tetrahydrofuryl]heptyl} salicylic acid, sodium salt A mixture of 10 g of crystalline antibiotic X-537A and 5 g of hydroxylamine hydrochloride in 50 ml ethanol containing 5 ml pryidine was heated under reflux for 60 hours. The solution was evaporated to dryness and treated with a mixture of 1N HCl and ethyl acetate. The ethyl acetate layer was washed with 1N HCl until all the pyridine and hydroxylamine had been removed. It was then treated with a saturated aqueous solution of sodium carbonate, separated and dried ($Na_2SO_4$). After evaporation to dryness, the residue was fractionally crystallized from ethanol. The first fraction was shown by TLC on silica gel using benzenemethanol (9:1) as solvent to be the sodium salt of the oxime previously isolated in Example 9 as its hydroxylammonium salt. Recrystallization from $CH_2Cl_2$/hexane gave white prisms of (−)-3-methyl-6-{7-ethyl-4-hydroxy-6-hydroxylimino-3,5-dimethyl-7-[5-ethyl-3-methyl-5-(5-ethyl-5-hydroxy-6-methyl-2-tetrahydro pyranyl)-2-tetrahydrofuryl]heptyl} salicylic acid, sodium salt, m.p. 173°–174°, $[\alpha]_D^{25} -11.99°$ (1%, methanol). The second crop (1.63 g) isolated by fractional crystallization of the crude sodium salt of the oxime was found to be an isomer of (−)-3-methyl-6-{7-ethyl-4-hydroxy-6-hydroxyimino-3,5-dimethyl-7-[5-ethyl-3-methyl-5-ethyl-5-hydroxy-6-methyl-2-tetrahydro pyranyl)-2-tetrahydrofuryl]heptyl} salicylic acid, sodium salt. Recrystallization from $CH_2Cl_2$/hexane gave white needles of (+)-3-methyl-6-{7-ethyl-4-hydroxy-6-hydroxyimino-3,5-dimethyl-7-[5-ethyl-3-methyl-5-(5-ethyl-5-hydroxy-6-methyl-2-tetrahydropyranyl)-2-tetrahydrofuryl]heptyl} salicylic acid, sodium salt, m.p. 220°C, $[\alpha]_D^{25} +27.16°$ (1%, methanol).

EXAMPLE 11

Preparation of
3-methyl-6-{7-ethyl-4-hydroxy-6-hydroxyimino-3,5-dimethyl-7-[5-ethyl-3-methyl-5-(5-ethyl-5-hydroxy-6-methyl-2-tetrahydropyranyl)-2-tetrahydrofuryl]heptyl} salicylic acid methyl ester, Isomer A A solution of 3.55 g of (−)-3-methyl-6-{7-ethyl-4-hydroxy-6-hydroxyimino-3,5-dimethyl-7-[5-ethyl-3-methyl-5-(5-ethyl-5-hydroxy-6-methyl-2-tetrahydropyranyl)-2-tetrahydrofuryl]heptyl} salicylic acid, sodium salt in 100 ml methylene chloride was treated with 1N HCl. The solvent layer was separated, washed with water and concentrated under reduced pressure to a solid. A portion (1.3 g) of the solid, equal to 2.15 millimole, was dissolved in ether and treated with 4.25 millimole of an ethereal solution of diazomethane. At the end of 1 hour the solvent was removed at reduced pressure leaving an oil which upon standing under a high vacuum solidified to yield 3-methyl-6-{7-ethyl-4-hydroxy-6-hydroxyimino-3,5-dimethyl-7-[5-ethyl-3-methyl-5-(5-ethyl-5-hydroxy-6-methyl-2-tetrahydropyranyl)-2-tetrahydrofuryl]heptyl}salicylic acid, methyl ester, isomer A; $[\alpha]_D^{25}$+ 5.77° (1.03%, $CH_3OH$).

EXAMPLE 12

Preparation of 3-methyl-6-{7-ethyl-4-hydroxy-6-hydroxyimino-3,5-dimethyl-7-[5-ethyl-3-methyl-5-(5-ethyl-5-hydroxy-6-methyl-2-tetrahydropyranyl)-2-tetrahydrofuryl]heptyl} salicylic acid methyl ester, Isomer B.

A solution of 1.77 g of (+)-3-methyl-6-{7-ethyl-4-hydroxy-6-hydroxyimino-3,5-dimethyl-7-[5-ethyl-3-methyl-5-(5-ethyl-5-hydroxy-6-methyl-2-tetrahydropyranyl)2-tetrahydrofuryl]heptyl}salicylic acid, sodium salt in 100 ml of methylene chloride was washed with 1N HCl. The solvent layer was separated, washed with water, and concentrated at reduced pressure to a solid. A portion (1.48 g) of the solid, equal to 2.45 millimoles was dissolved in ether and treated with 5 millimoles of a solution of diazomethane in ether. After one hour the solvent was removed in vacuo leaving an oil which upon standing under high vacuum solidified to yield 3-methyl-6-{7-ethyl-4-hydroxy-6-hydroxyimino-3,5-dimethyl-7-[5-ethyl-3-methyl-5-(5-ethyl-5-hydroxy-6-methyl-2-tetrahydropyranyl)-2-tetrahydrofuryl]heptyl}salicylic acid methyl ester, Isomer B; $[\alpha]_D^{25}$+ 32.63° (1.01%, $CH_3OH$).

EXAMPLE 13

Preparation of 5-iodo-3-methyl-6-{7-ethyl-4-hydroxy-3,5-dimethyl-6-oxo-7-[5-ethyl-2-methyl-5-(5-ethyl-5-hydroxy-6-methyl-2-tetrahydropyranyl)-2-tetrahydrofuryl]heptyl}salicylic acid, sodium salt A solution of 1.8 g of crystalline antibiotic X-537A in 50 ml of glacial acetic acid was treated with 980 mg of iodine monochloride (freshly distilled 97°–99° fraction). The ICl was mixed with 5 ml of acetic acid and added to the reaction slowly over a period of 15 minutes. After an additional 15 minutes, water (100 ml) was slowly added and the mixture extracted with ether. The solvent layer was separated and washed successively with aqueous solutions of sodium bisulfite, sodium bicarbonate and sodium carbonate. The solvent was dried ($Na_2SO_4$). After concentration and crystallization, the product 5-iodo-3-methyl-6-{7-ethyl-4-hydroxy-3,5-dimethyl-6-oxo-7-[5-ethyl-2-methyl-5-(5-ethyl-5-hydroxy-6-methyl-2-tetrahydropyranyl)-2-tetrahydrofuryl]heptyl} salicylic acid, sodium salt was recovered by fitration. Recrystallization from ethyl acetate gave 5-iodo-3-methyl-6-{7-ethyl-4-hydroxy-3,5-dimethyl-6-oxo-7-[5-ethyl-2-methyl-5-(5-ethyl-5-hydroxy-6-methyl-2-tetrahydropyranyl)-2-tetrahydrofuryl]heptyl} salicylic acid, sodium salt, m.p. 222.5°–223°. $[\alpha]_D^{25}$ −48.7° (1%, $CHCl_3$).

Alternatively 5-iodo-3-methyl-6-{7-ethyl-4-hydroxy-3,5-dimethyl-6-oxo-7-[5-ethyl-2-methyl-5-(5-ethyl-5-hydroxy-6-methyl-2-tetrahydropyranyl)-2-tetrahydrofuryl]heptyl} salicylic acid, sodium salt could be prepared by treatment of crystalline antibiotic X-537A (1 millimole) with iodine (1 millimole) and morpholine (3 millimoles). The reaction usually was complete in 5 days and the product, purified by chromatography, was identical to the above.

EXAMPLE 14

Preparation of 3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} acetyl salicylic acid, methyl ester 1.344 g (2 mole) of 3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} acetyl salicylic acid, sodium salt was treated with ether (30 ml) and 1N HCl (30 ml). The mixture was shaken in a separatory funnel until all the starting material had dissolved. The ether layer was then washed twice with water and treated with 20 ml solution of ethereal diazomethane (5 mmole). After drying ($Na_2SO_4$), the solution was evaporated to give 3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} acetyl salicylic acid, methyl ester as an oil, $[\alpha]_D^{25}$ +0.99° (1% in methanol).

EXAMPLE 15

Preparation of 5-bromo-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} acetyl salicylic acid, sodium salt To a solution of 2.11 g of the sodium salt of 5-bromo-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} salicylic acid in 20 ml of dry pyridine was added 0.66 ml of acetic anhydride. After 4 hours at room temperature, the reaction mixture was diluted with ice water containing 40 ml of HCl and ethyl acetate. The ethyl acetate was separated, washed with 1N HCl until the pyridine was removed and then washed with a saturated aqueous solution of sodium carbonate and dried over $Na_2SO_4$. The ethyl acetate was evaporated to 25 ml from which 5-bromo-3-methyl-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} acetyl salicylic acid, sodium salt was recovered by filtration. M.p. 213°–215° $[\alpha]_D$−3.5° (1%, methanol). An additional yield of the desired product was recovered from the mother liquor after crystallization from methylene chloride/hexane.

EXAMPLE 16

Preparation of 5-nitro-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicyclic acid, sodium salt To a solution of 2 g. of crystalline antibiotic X-537A in 75 ml. glacial acetic acid was added 1 ml. concentrated nitric acid and after stirring for ½ hour, an equal volume (75 ml.) of water was added. The resulting yellow amorphous precipitate was extracted with ether. The ether layer was washed with sodium carbonate until all the acetic acid had been removed. After drying ($Na_2SO_4$), the ether was removed under reduced pressure to give 2.4 g. of a yellow solid. Treatment with methylene chloride followed by filtration gave a crystalline product which was discarded. The methylene chloride filtrate was concentrated under reduced pressure and chromatographed on a silica (20 g.) column using methylene chloride containing 1% methanol as eluant. The first fraction eluted gave 5-nitro-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicyclic acid, sodium salt which on recrystallization from methylene chloride/hexane gave pale yellow plates, m.p. 214°–215°, $[\alpha]_D^{25}$ 98.05° (1%, DMSO).

EXAMPLE 17

Preparation of 3-methyl-2-propionyloxy-6-(7-ethyl-4-hydroxy-3,5-dimethyl-6-oxo-7-(5-ethyl-3-methyl-5-(5-ethyl-5-hydroxy-6-methyl-2-tetrahydropyranyl)-2-tetrahydrofuryl)heptyl)benzoic acid, sodium salt To a solution of 3.0 g. (49 mmoles) of the crystalline antibiotic X-537A in 75 ml. of pyridine, 0.7 ml. (54 mmoles) of propionic anhydride was added and the mixture kept at room temperature for 16 hours. Most of the solvent was then removed by concentration at reduced pressure below 35°. The residue was dissolved in methylene chloride, washed with dilute hydrochloric acid, dilute sodium carbonate and water and dried (Na$_2$SO$_4$). Solvent was then removed by distillation under reduced pressure. The residue crystallized from hexane to yield 3-methyl-2-propionyloxy-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}benzoic acid, sodium salt; m.p. 193°–195°. Recrystallization did not alter the melting point; $[\alpha]_D^{25}$ −20.3° (C=1.3,MeOH).

EXAMPLE 18

In a similar fashion as that disclosed in Example 17, the following compounds may be prepared from the indicated starting materials:

2-butyryloxy-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}benzoic acid, sodium salt, m.p. 191°–193°, $[\alpha]_D^{25}$ −20.1° (C=1, MeOH); from 3.0 g. of crystalline antibiotic X-537A and 0.88 ml. of butyric anhydride.

2-benzoyloxy-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}benzoic acid, sodium salt, m.p. 177°–180°; from crystalline antibiotic X-537A and benzoic anhydride.

EXAMPLE 19

Preparation of the Ammonium Salt of Antibiotic X-537A 15.0 g. of the sodium salt of antibiotic X-537A was dissolved in ethyl acetate (500 ml.) and washed three times with water, and three times with 200 ml. portions of 2.8% ammonium hydroxide solution. Removal of solvent from the ethyl acetate phase left a residue which was crystallized from methylene chloride/hexane to afford white crystals of the ammonium salt of antibiotic X-537A, m.p. 195°–196.5° (dec.), $[\alpha]_D^{25}$ −50.84° (C=1.3 in methanol). Concentration of the mother liquors afforded additional material, m.p. 194°–196°.

EXAMPLE 20

Preparation of Sodium Salt of Antibiotic X-537A

The sodium salt was prepared by shaking an ether solution of the free acid of antibiotic X-537A with aqueous sodium carbonate. The salt which remained in the ether was recrystallized twice from benzene-ligroin and dried. It had a melting point, taken in an open capillary tube of 191°–192°C. dec.

EXAMPLE 21

Preparation of the Lithium Salt of Antibiotic X-537A 5.0 g. of the sodium salt of antibiotic X-537A dissolved in ethyl acetate (200 ml.). The solution was washed in turn with 100 ml. portions of 1N hydrochloric acid (twice), water (twice), barium hydroxide solution (twice) and lithium sulfate solution (twice). A white solid was recovered by evaporation of the organic phase, and on recrystallization from methylene chloride/hexane yielded the lithium salt as white crystals, m.p. 161°–162° (dec.), $[\alpha]_D^{25}$ −8.27° (C=1.23 in methanol).

EXAMPLE 22

Preparation of 3-methyl-2-propionyloxy-6-{7-ethyl-4-Hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}benzoic acid, sodium salt 6.12 g. of the sodium salt of antibiotic X-537A was dissolved in pyridine (10 ml.) by warming slightly. The solution was cooled in an ice bath and treated with propionyl chloride, then allowed to stand at room temperature for 2 hours. The mixture was poured into water, extracted with ethyl acetate, and the organic phase washed in succession with 1N hydrochloric acid (several times) and sodium carbonate solution (twice). Evaporation of the ethyl acetate solution left a residue which was crystallized from methylene chloride/hexane to afford 3-methyl-2-propionyloxy-6-(7-ethyl-4-hydroxy-3,5-dimethyl-6-oxo-7-(5-ethyl-3-methyl-5-(5-ethyl-5-hydroxy-6-methyl-2-tetrahydropyranyl)-2-tetrahydrofuryl)heptyl)benzoic acid, sodium salt, m.p. 185°–186.5° $[\alpha]_D^{25}$ −20.00° (C=1.00 in methanol).

EXAMPLE 23

Preparation of ammonium 3-methyl-2-(2-methyl-propionyloxy)-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl] eptyl} benzoate A solution of the sodium salt of antibiotic X-537A (6.12 g.) in pyridine (10 ml.) was cooled in an ice bath and treated with isobutyric anhydride (1.74 g. in 3 ml. of pyridine). After stirring at room temperature for 2 days, the mixture was poured into water, extracted with ethyl acetate, and the organic phase washed with 1N hydrochloric acid and 2.8% ammonium hydroxide. The residue obtained on evaporation of the ethyl acetate solution was ammonium-3-methyl-2-(2-methyl-propionyloxy)-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl] heptyl} benzoate in solid form, m.p. approx. 98° (dec.), $[\alpha]_D^{25}$ −23.33° (C=1.25 in methanol).

EXAMPLE 24

Preparation of ammonium-3-methyl-2-nicotinoyloxy-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} benzoate A solution of the sodium salt of antibiotic X-537A (6.12 g.) in pyridine (10 ml.) was stirred at room temperature under nitrogen with 3 g. of nicotinoyl chloride hydrochloride for 13 days. Extraction and purification as in Example 22 gave a yellow residue which resisted crystallization. Attempted crystallization from hexane gave a gum which was dried on a clay plate to an amorphous solid, m.p. 81°–92° (dec.) $[\alpha]_D^{25}$ −14.64° (C=1.04 in methanol).

EXAMPLE 25

Preparation of 5-phenylazo-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} salicylic acid To a solution of 0.18 ml. of aniline in 8 ml. of N HCl, cooled to 0°–5°C. in an ice bath was slowly added 150 mg. of $NaNO_2$ in water chilled to the same temperature. To the above solution was added a cold methanolic solution of 550 mg. of crystalline antibiotic X-537A. The reaction mixture was kept at 3° to 5° for 15 minutes and then allowed to slowly reach room temperature. At the end of 2 hours, the reaction mixture was diluted with water and extracted with ethyl acetate. The solvent extract was washed with a saturated solution of $Na_2CO_3$, dried over $NaSO_4$ and concentrated to a solid. The solid was chromatographed on a 30 g. silica gel (Grade 62) column eluting with a gradient between 300 ml. methylene chloride and 500 ml. ether. The product was eluted in the first peak and crystallized from methylene chloride/hexane, m.p. 212°–215°, $[\alpha]_D^{25}$ −27.30° (0.586%, $CH_3OH$).

EXAMPLE 26

Preparation of 5-amino-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]-heptyl} salicylic acid A solution of 5.0 g. (7.6 millimole) of 5-nitro-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]-heptyl} salicylic acid in ethanol (450 ml.) was hydrogenated over 2 g. of Raney-nickel with an uptake of 22.2 mm. of hydrogen. The reaction was filtered (over $N_2$) and 17.2 ml. of N HCl was added. The solvent was removed under reduced pressure, and the residue was crystallized from aqueous acetone to give 5-amino-3-methyl-6- 7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]-heptyl salicylic acid, m.p. 223°–225°$[\alpha]_D^{25}$+17.92° (1%, MeOH).

EXAMPLE 27

Preparation of 3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} salicylic acid, methyl ester To a solution of 6.2 g. of crystalline antibiotic X-537A in 125 ml. of methylene chloride was added 4.6 g. of silver oxide and 14 g. of methyl iodide. After stirring for 18 hours, the reaction mixture was filtered and the filtrate concentrated to 7.07 g. of a light yellow oil, which was decolorized with Darco, giving 6.09 g. of a colorless foam. A portion (4 g.) of the foam was chromatographed on a florisil column (150 g.) eluting with a gradient between methylene chloride (1 l.) to ether (1 l. ) and then ether (500 ml.) to acetone (500 ml.). Rechromatography of the slightly yellow oil, recovered from the florisil column, on a 75 g. silica gel column and eluting with a gradient between methylene chloride (1 l.) and 15% ether/methylene chloride gave 200 mg. of a clear viscous oil, Bp. 170°d/005 mm. $[\alpha]_D^{25}$ −7.19°, (1.1%, $CH_3OH$).

EXAMPLE 28

Preparation of 5-acetamido-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} salicylic acid To a suspension of 1.21 g. (2 mmole) of 5-amino-3-methyl-6- {7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]-heptyl} salicylic acid in 50 ml. glacial acetic acid was added 1 ml. acetic anhydride (~10 mmoles). On warming the mixture to 70° on a steam bath, the amine dissolved and after a further half an hour at room temperature, the solution was poured on to crushed ice. The mixture was carefully made alkaline with sodium carbonate solution and extracted twice with 400 ml. ether. After drying ($NaSO_4$) the ethereal solution was evaporated to approximately 100 ml. The resulting microcrystalline product had m.p. 189°–190°, $[\alpha]_D$ −17.45° (1%, MeOH).

EXAMPLE 29

Preparation of 5-diazo-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} salicylic acid A solution of 5-amino-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl} salicylic acid (1.28 g.) in 10 ml. methanol and 2 ml. of aqueous N HCl was cooled to 0° and a chilled solution of 150 mg. of $NaNO_2$ in 1 ml. water was slowly added. To the solution was added 320 mg. of CuCl in 1 ml. of concentrated HCl. The reaction mixture was allowed to slowly warm up to room temperature and then diluted with water and extracted with ether. The ether extract was concentrated to a small volume and the crystallized product was collected by filtration, m.p. 137°–138°. $[\alpha]_D$ −13.5° (0.7%, $CH_3OH$).

EXAMPLE 30

Preparation of 5-acetamido-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}acetyl salicylic acid To a solution of 5-amino-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]-heptyl}salicylic acid (1.21 g.) in 20 ml. of pyridine was added 0.56 ml. of acetic anhydride. At the end of 4 hours, the reaction was poured into 100 ml. ice water containing 20 ml. of concentrated HCl. The solution was extracted with ether, twice, and the solvents concentrated to dryness. The residue was dissolved in ethyl acetate from which a semicrystalline material was recovered after addition of hexane. Recrystallization of this material from methylene chloride/ether gave the crystalline product, m.p. 190°–192°, $[\alpha]_D^{25}$ −18.38° (C, 1.1%, $CH_3OH$).

EXAMPLE 31

Preparation of 5-chloro-3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}salicylic acid To a cold solution (~3°) of 6.12 g. of the sodium salt of antibiotic X-537A in 50 ml. of chloroform/3 ml. of carbon tetrachloride was slowly added 34 ml. of carbon tetrachloride saturated with 10 millimoles of chlorine gas. The reaction was continued for ½ hour after which the solution was filtered and the filtrate treated with a saturated aqueous solution of $Na_2CO_3$. The solvent layer was dried over $Na_2SO_4$ and concentrated to a small volume from which after addition of hexane the crystalline product was recovered. The crystalline material which had a tendency to incorporate the solvent of crystallization was twice recrystallized from methylene chloride/ether and acetone/hexane, m.p. 183°–185°, $[\alpha]_D^{25}$ −44.31° (C, 0.99%, $CHCl_3$).

EXAMPLE 32

This example illustrates the utilization of a representative member of the compounds of the present invention as a coccidiostatic agent in an animal feed. In a manner similar to that described below, the remaining compounds encompassed by the present invention may also be incorporated as active coccidiostatic agents into animal feeds.

A medicated poultry feed intended as a starter feed for broilers is prepared by blending 0.005 percent by weight of 3-methyl-6-{7-ethyl-4-hydroxy-3,5-dimethyl-6-oxo-7-[5-ethyl-3-methyl-5-(5-ethyl-5-hydroxy-6-methyl-2-tetrahydropyranyl)-2-tetrahydrofuryl]heptyl}acetyl salicylic acid, sodium salt in a basic poultry ration consisting of:

| | |
|---|---:|
| Corn meal, No. 2. yellow, ground | 1123 |
| Stabilized grease or vegetable oil | 60 |
| Soybean oil meal (low fiber content 50% protein) | 480 |
| Corn Gluten meal | 50 |
| Fish meal, antioxidant treated, 60% protein | 30 |
| Fish solubles, dried basis | 10 |
| Meat and bone scraps, 50% protein | 140 |
| Corn distillers dried solubles | 50 |
| Alfalfa meal, 17% protein 100,000 A/lb. | 30 |
| Salt, iodized | 5 |
| Manganese sulfate, feed grade | 0.75 |
| Zinc carbonate or oxide | 0.25 |
| Riboflavin, Grams | 3 |
| Vitamin $B_{12}$, mg. | 6 |
| Calcium pantothenate, gms. | 5 |
| Niacin, gm. | 30 |
| Stabilized vitamin A USP units | 6,000,000 |
| Vitamin $D_3$, IC units | 650,000 |
| Vitamin E acetate, IU | 5,000 |
| Vitamin E (menadione sodium bisulfite) gms. | 2 |
| DL-methionine or hydroxy analog, pound | 1 |
| Antioxidant (ethoxyquin or butylated hydroxy toluene) lb. | 0.25 |

Similar feeds can be prepared containing the active ingredient 3-methyl-6-(7-ethyl-4-hydroxy-3,5-dimethyl-6-oxo-7-(5-ethyl-3-methyl-5-(5-ethyl-5-hydroxy-6-methyl-2-tetrahydropyranyl)-2-tetrahydrofuryl)heptyl) acetyl salicylic acid, sodium salt at other concentrations, for example containing from 0.001 percent to 0.0125 percent by weight of said compound.

We claim:

1. A compound selected from the group of compounds of the formula

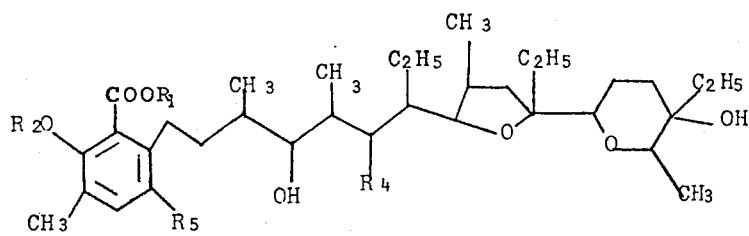

wherein $R_1$ is selected from the group consisting of hydrogen, lower alkyl, phenyl, and phenyl substituted by a member of the group consisting of halogen, nitro and lower alkyl; $R_2$ is selected from the group consisting of hydrogen, lower alkyl, lower alkanoyl,

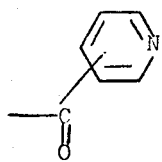

benzoyl, and benzoyl substituted by a member of the group consisting of halogen, nitro and lower alkyl; $R_5$ is selected from the group consisting of phenylazo and phenylazo substituted by a member of the group consisting of halogen, nitro, lower alkyl and lower alkoxy; and $R_4$ is selected from the group consisting of —OH, =O, and =N—OH and the pharmaceutically acceptable alkali metal, alkaline earth metal and ammonium salts thereof.

2. The compound of claim 1 of the formula 5-phenylazo-3-methyl-6-(7-ethyl-4-hydroxy-3,5-dimethyl-6-oxo-7-<5-ethyl-3-methyl-5-(5-ethyl-5-hydroxy-6-methyl-2-tetrahydropyranyl)-2-tetrahydrofuryl>heptyl) salicylic acid.

* * * * *